United States Patent Office 3,319,778
Patented May 16, 1967

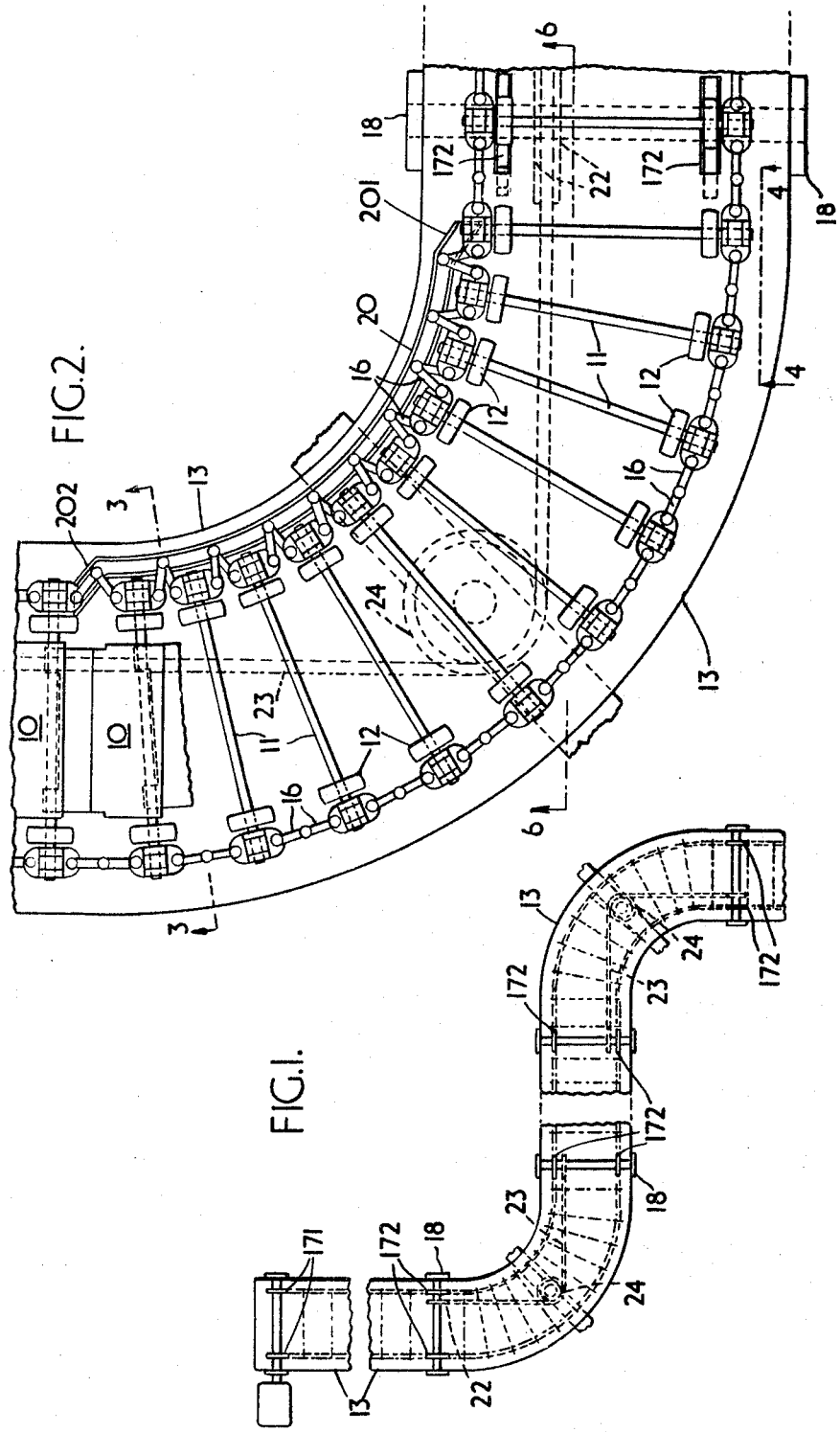

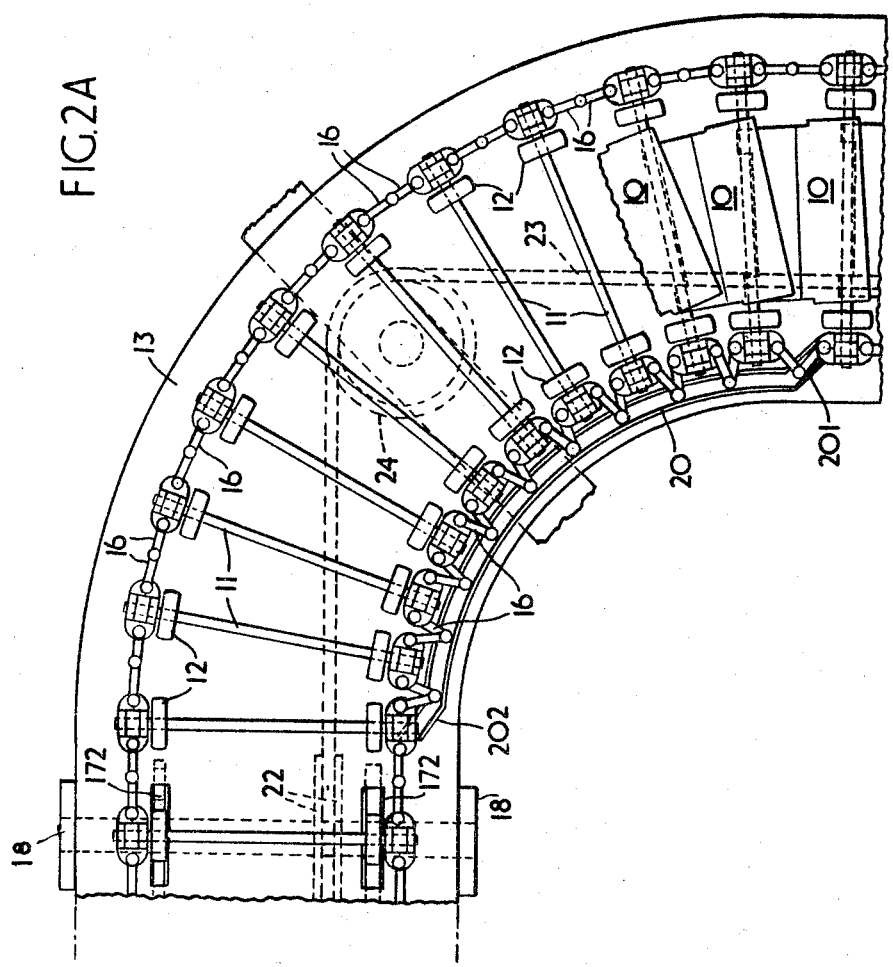

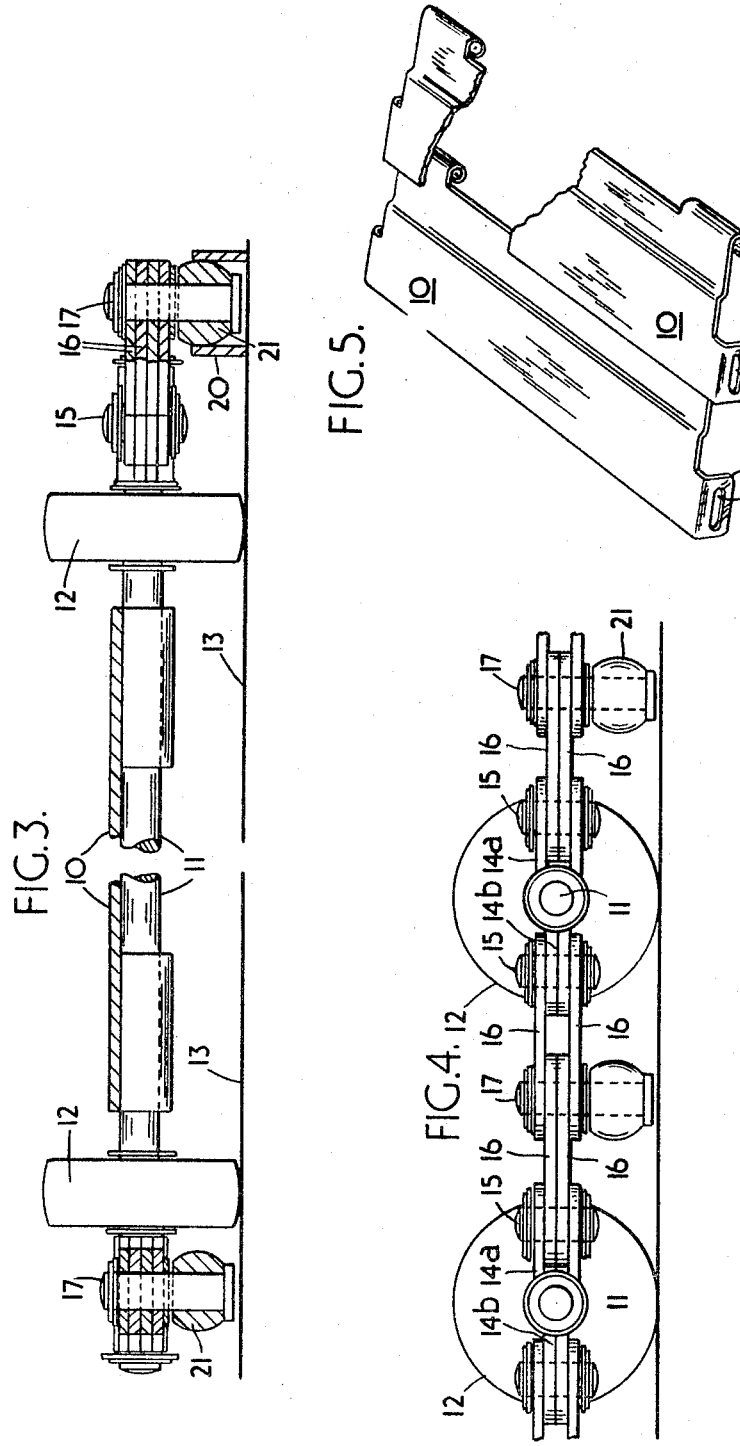

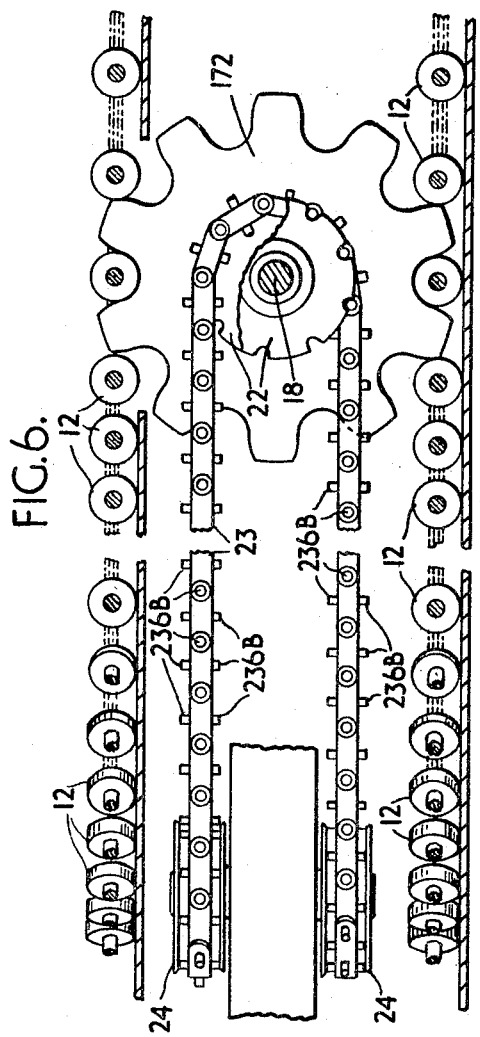

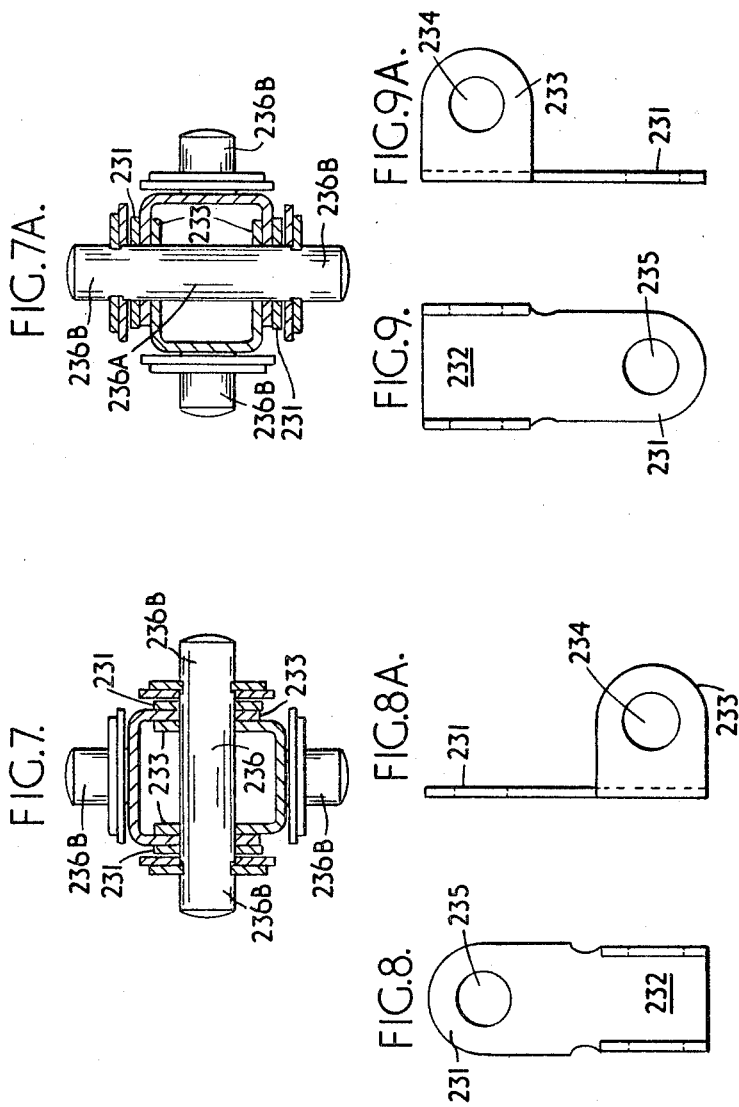

3,319,778
ENDLESS CHAIN CONVEYORS
Albert Douglas Bessant, Morden, England, assignor to Himpelm Engineers Ltd., Walsall, England, a corporation of Great Britain and Northern Ireland
Filed Mar. 30, 1966, Ser. No. 538,781
Claims priority, application Great Britain, Apr. 1, 1965, 13,786/65; Aug. 19, 1965, 35,572/65
4 Claims. (Cl. 198—182)

This invention has reference to endless chain conveyors and is an improvement in or modification of the endless chain conveyors described and illustrated in the specification of our pending United States patent application Ser. No. 385,631, now Patent No. 3,265,193, filed July 28, 1964.

In the specification of our aforesaid United States patent application Ser. No. 385,631, now Patent No. 3,265,193, there is described, illustrated and claimed an endless chain conveyor in which the conveying surface or surfaces is or are supported by rollers therein defined as the main rollers which are adapted to run on tracks arranged at each side of the conveying surface or surfaces and in which the links of each of a pair of endless driving chains which are arranged one at each side of the conveying surface or surfaces are interconnected so as to permit hinging about both horizontal and vertical axes and in which control rollers are provided at each side of the conveying surface or surfaces intermediate the main rollers aforesaid, which are supported from the respective endless driving chains and which themselves are adapted to run on auxiliary tracks provided around a lateral bend or curve to define and control the direction of travel of the endless driving chains, said conveying surface or surfaces where a multiplicity are employed being capable of an overlapping sliding movement relatively to each other or of looping where a continuous conveying surface is concerned whereby the conveying surface or surfaces is or are permitted to negotiate lateral bends or curves under the governance of said control rollers in association with the tracks provided therefor.

With an endless chain conveyor as described and illustrated in our said prior United States patent application Ser. No. 385,631, now Patent No. 3,265,193, as the slats approach a bend the control rollers ride up and on to their relevant radius control tracks so that the links carrying the main rollers on the inside of the bend are drawn closer together so that adjacent portions of the slats can slide over one another to a greater degree of overlap. Further the torque chain pulleys which are provided to co-operate with torque chains to resist torque stresses are arranged on the outside of a bend on the central radius of the bend and as a consequence project from the side of the conveying surface.

The present invention has for its object to provide an endless chain conveyor operating on the principles described in the specification of our prior United States patent application Ser. No. 385,631, now Patent No. 3,265,193, in which the control rollers and the torque chain pulleys with their associated chains are located below the conveying surface so that the conveying surface is free of obstructions.

Accordingly the invention consists of an endless chain conveyor in which the conveying surface or surfaces is or are supported by rollers herein defined as the main rollers which are adapted to run on tracks arranged at each side of the conveying surface or surfaces and in which the main rollers are mounted on axles which serve to support the conveying surface or surfaces and in which the said axles and hence the main rollers are interconnected by links which are capable of a vertical hinging movement relatively to the said axles and by links which are capable of a horizontal hinging movement relatively to each other and in which vertical pivots common to the interconnecting links which are capable of horizontal hinging serve to carry control rollers adapted to run on or in auxiliary tracks provided around a lateral bend or curve and below the plane of the conveying surface or surfaces, to define and control the direction of travel of said conveying surface or surfaces whereby the conveying surface or surfaces is or are permitted to negotiate lateral bends or curves under the governance of the control rollers in association with the auxiliary tracks provided therefor.

The invention also resides in an endless chain conveyor as aforesaid having torque resisting means as in the parent specification in which the torque resisting pulleys and their associated torque chains are disposed below the conveying surface or surfaces.

The invention further resides in an endless chain conveyor constructed, arranged and adapted for use substantially as will be described hereinafter.

An embodiment of the invention will now be described with particular reference to the accompanying drawings which illustrate the invention as applied to an endless chain conveyor in which the conveying surface is constituted by a plurality of sheet metal slats capable of assuming an overlapping relationship with one another as disclosed in our prior United States patent application Ser. No. 385,631, now Patent No. 3,265,193.

In the drawings:

FIGURE 1 is a diagrammatic view in plan of a conveyor in accordance with the invention traversing a sinuous path.

FIGURE 2 and FIG. 2A together represent a plan of the major part of the sinuous track conveyor illustrated in FIGURE 1 on an enlarged scale.

FIGURE 3 is a section on an enlarged scale taken on the plane indicated by the line 3—3 in FIGURE 2.

FIGURE 4 is a fragmentary view on an enlarged scale of the portion indicated by the arrows 4—4 in FIGURE 2 looking in the direction of the arrows.

FIGURE 5 is a fragmentary view of the slats employed as the conveying surface in the conveyor illustrated in FIGURES 1–5.

FIGURE 6 is a fragmentary view illustrating the manner of driving the conveyor and mounting the torque resisting chains.

FIGURE 7 is a fragmentary view in section showing adjacent half-links of the torque chain assembled for turning about a horizontal axis.

FIGURE 7A is a fragmentary view complementary to FIGURE 8 showing adjacent half-links of the torque chain assembled for turning about a vertical axis.

FIGURE 8 is a plan of one of the inner half-links used in the construction of a torque chain.

FIGURE 8A is an edge view of FIGURE 8.

FIGURE 9 is a plan of one of the outer half-links used in the construction of a torque chain and FIGURE 9A is an edge view of FIGURE 9.

In the drawings like numerals of reference indicate similar parts in the several views.

The slats 10 forming the conveyor surface are mounted on axles 11 which project through slots 101 in the downwardly turned ends 102 of the said slats 10, see FIGURE 5, and which have rollers 12 turnably inboard of the outwardly projecting end portions of the said axles 11 said rollers 12 as in our prior patent specification being termed hereinafter main rollers 12.

The main rollers 12 are adapted to be supported on and to run on tracks 13 arranged at each side of an installed conveyor, see FIGURES 1 and 2.

Each main rolls axle 11 serves as the pivot pin for pairs of half-links 14a, 14b one of which is provided with a bifurcated portion and the other of the pair with a knuckle portion adapted to engage knucklewise within the bifurcated portion of the complementary half-link so that the half-links 14a, 14b can turn about a horizontal axis that is the axis of the relevant axle 11.

Each of the half-links 14a, 14b aforesaid has connection by a vertical pivot pin 15 with a pair of half-links 16.

The flat links 16 of one half intermediate link are enclosed between the flat half intermediate links 16 of the complementary half intermediate link 16. The intermediate half-links 16 are interconnected by common vertical pivot pins 17 so that the said intermediate half-links 16 can pivot about vertical axes.

The main rollers 12 which are located on the inside of the driving chain built up as aforesaid seat within the gaps between the teeth of driving and idler sprockets 171, 172 respectively mounted on axles 18 carried by the framework of the conveyor in an analogous manner to that disclosed in the parent specification.

Adjacent each lateral bend or curve there is provided on the inside of the bend or curve and below the plane of the conveying surface an auxiliary track 20 of channel cross-section said auxiliary tracks 20 being hereinafter termed the radius control tracks 20 and each common pivot pin 17 of the intermediate half-links 16 has mounted thereon a part spherical roller 21 hereinafter termed control rollers 21 each of which is adapted to run in the relevant channel section radius control tracks 20 aforesaid as will be described hereinafter.

At the ends the radius control tracks 20 are provided with "lead-in" and "exit" guiding sections 201, 202 for a purpose to be described hereinafter.

Adjacent each bend there is provided as in the parent specification an axle 18 for an idler sprocket 172 on which is mounted corner drive sprockets 22 around which is passed an endless torque chain 23 which in turn is passed round pulleys 24 herein termed torque chain pulleys 24 said torque chains 23 being capable of hinging about horizontal and vertical axes in a manner to be described hereinafter and generally similar to the chains described in the parent specification.

The torque chains 23 are built up of inner and outer links 231 and 232 each of which is formed at one end with flanges 233 having therein aligned holes 234 whilst the other end is formed with a hole 235. The inner and outer links 231 and 232 are assembled either as illustrated in FIGURE 7 or in FIGURE 7A according as to whether the chosen half-links are required to be capable of turning about a horizontal axis (FIGURE 7) or a vertical axis (FIGURE 7A). In each case the pivotal axes are formed by rods 236 and 236A which are passed through the respective aligned pairs of holes 234.

The rods 236, 236A are provided at each end with projecting portions 236B so that the vertical projecting rods 236B can engage with recesses formed in pulleys 24 and the horizontal projecting rods 236B can engage in recesses formed in a corner drive wheel 22.

According to the arrangement of this invention the torque chains 23, the torque resisting pulleys 24 and corner drive pulleys 22 are located below the conveying surface so that the said torque resisting pulleys 24 and corner drive pulleys 22 and their associated torque chains 23 do not constitute obstructions at a lateral bend or curve.

The slats 10 have a uniform lap-over relationship to one another and the load thereon is supported by the main rollers 12 which run on the main tracks 13 as in the parent specification.

As the slats 10 approach a bend or curve the control rollers 21 ride outwardly by way of the respective "lead-in" guiding sections 201 into their relevant radius control tracks 20 so that the intermediate half-links 16 aforesaid on the inside of the bend or curve are drawn closer together below the plane of the conveying surface so that adjacent portions of the slats 10 can slide over one another to a greater degree of overlap. After negotiating a bend or curve the control rollers 21 "ride" inwardly into the line of drive by way of the relevant "exit" guiding section 202.

It will be appreciated that it is not necessary to have radius control tracks 20 on the outside of a bend or curve, although such radius control tracks may be provided if preferred.

Further it will be appreciated that an endless chain conveyor in accordance with the invention is capable of travelling around lateral bends of 180° or more and to traverse a laterally deviating sinuous path without difficulty.

Moreover it will be appreciated that the conveying surface is entirely clear since the auxiliary tracks 20 and the torque resistant pulleys 24 and their associated chains 23 are located below the plane of conveying surface.

It will be understood that instead of solid sheet metal slats 10 slats of wire mesh may be employed or even a continuous belt which is formed so as to be capable of forming depending loops whilst progressing through the zone of a bend as in the parent specification of my pending United States patent application Ser. No. 385,631, now Patent No. 3,265,193.

I claim:

1. An endless chain conveyor incorporating a conveying surface means, main rollers for supporting said conveying surface means, axles for carrying opposite pairs of said main rollers, tracks for said main rollers arranged at each side of the conveying surface means, endless chains arranged at each side of the conveying surface means including links which are interconnected so as to permit hinging about both horizontal and vertical axes, sprockets for carrying and driving said endless chains the teeth of which are engaged by said main rollers, control rollers provided at each side of the conveying surface and located outboard of the main rollers aforesaid, links located below the plane of the supporting surface means which are hingedly interconnected by common vertical pivot pins, said vertical pivot pins serving also as axles for the said control rollers thereby permitting them to contract or fold in a horizontal direction, discontinuous auxiliary tracks for the control rollers provided around a lateral bend outboard of said main rollers to define and control the direction of travel of the endless chains around the relevant lateral bend, said auxiliary tracks located below the plane of the conveying surface means, said conveying surface means being arranged in a plane above the main rollers, control rollers and links aforesaid and being capable of variation of effective surface area to permit the conveying surface means to negotiate lateral bends under the governance of said control rollers in association with the auxiliary tracks aforesaid, said means adjacent each bend for resisting torque resulting from the negotiation of each bend.

2. An endless chain conveyor as claimed in claim 1 incorporating torque resisting means comprising a driving axle on which the sprockets aforesaid are mounted, idler sprockets for supporting the endless chains, axles for said idler sprockets, pulleys, and torque resisting chains which are passed around the relevant sprockets as aforesaid and around said pulleys, said torque resisting chains being disposed below the plane of the conveying surface means.

3. An endless chain conveyor as claimed in claim 1 in which the control rollers and their complementary auxiliary tracks are arranged outboard of the edges of the conveying surface means.

4. An endless chain conveyor as claimed in claim 1 in which each of the discontinuous auxiliary tracks is provided at the approach ends with lead-in sections and at the opposite ends with exit sections.

References Cited by the Examiner
UNITED STATES PATENTS

| | | | |
|---|---|---|---|
| 1,626,492 | 4/1927 | Youngson | 198—181 |
| 3,265,193 | 8/1966 | Bessant | 198—182 |

EVON C. BLUNK, *Primary Examiner.*

SAMUEL F. COLEMAN, M. L. AJEMAN, *Examiners.*